Aug. 11, 1942.  C. S. WILEMAN  2,292,855
GRIT COLLECTOR
Original Filed March 10, 1937   4 Sheets-Sheet 3
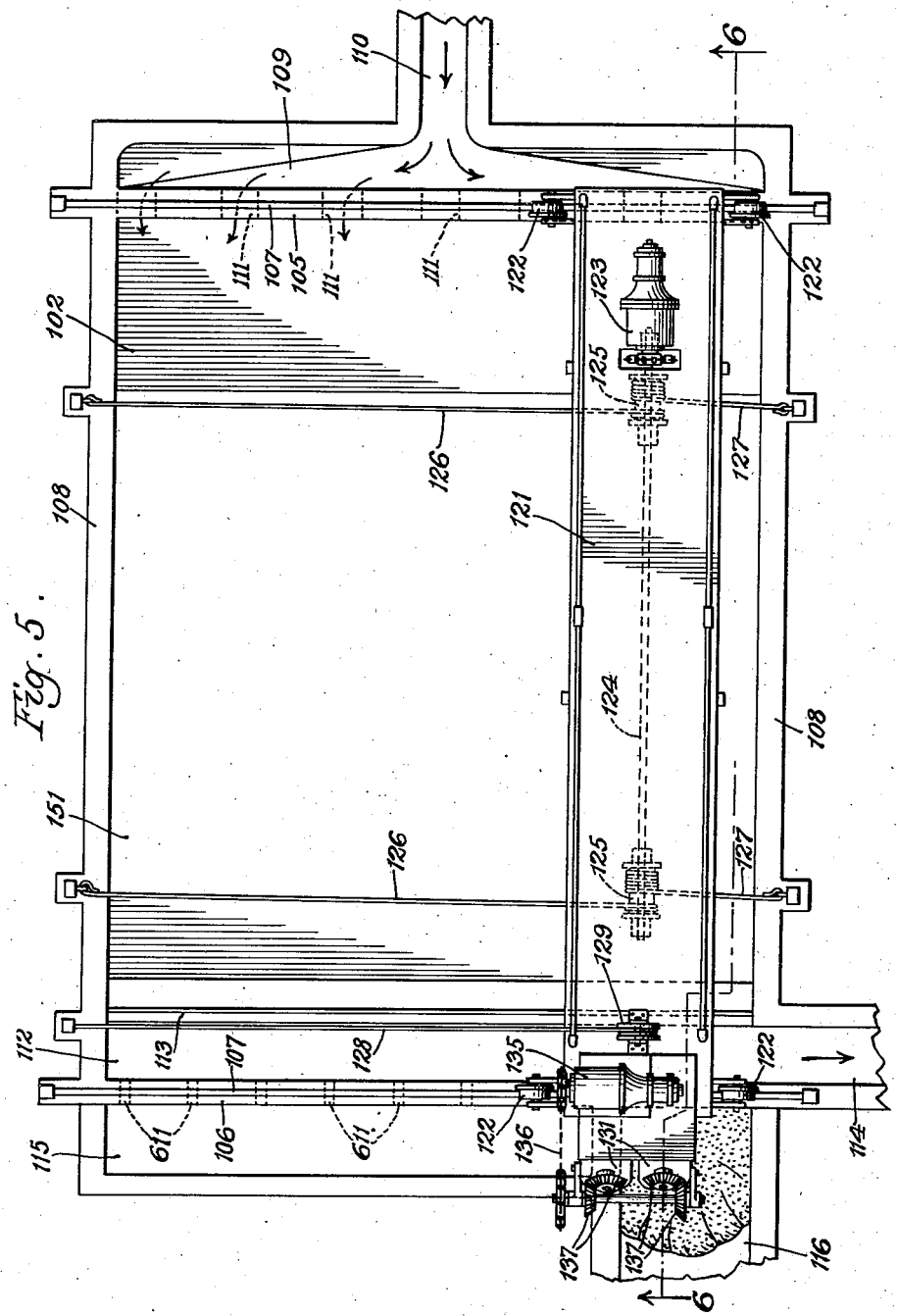
Inventor.
Crozier S. Wileman.
by Parker & Carter
Attorneys.

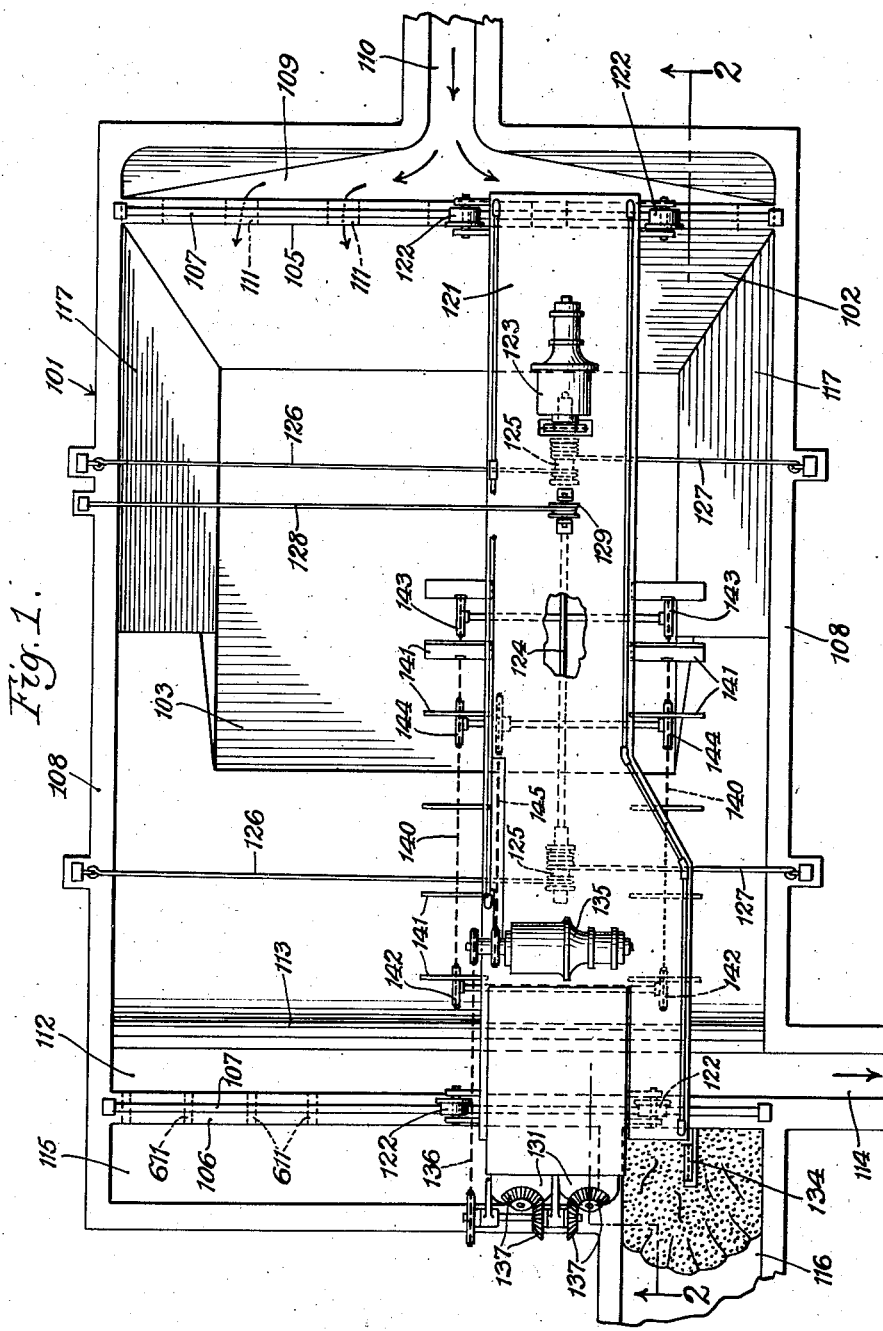

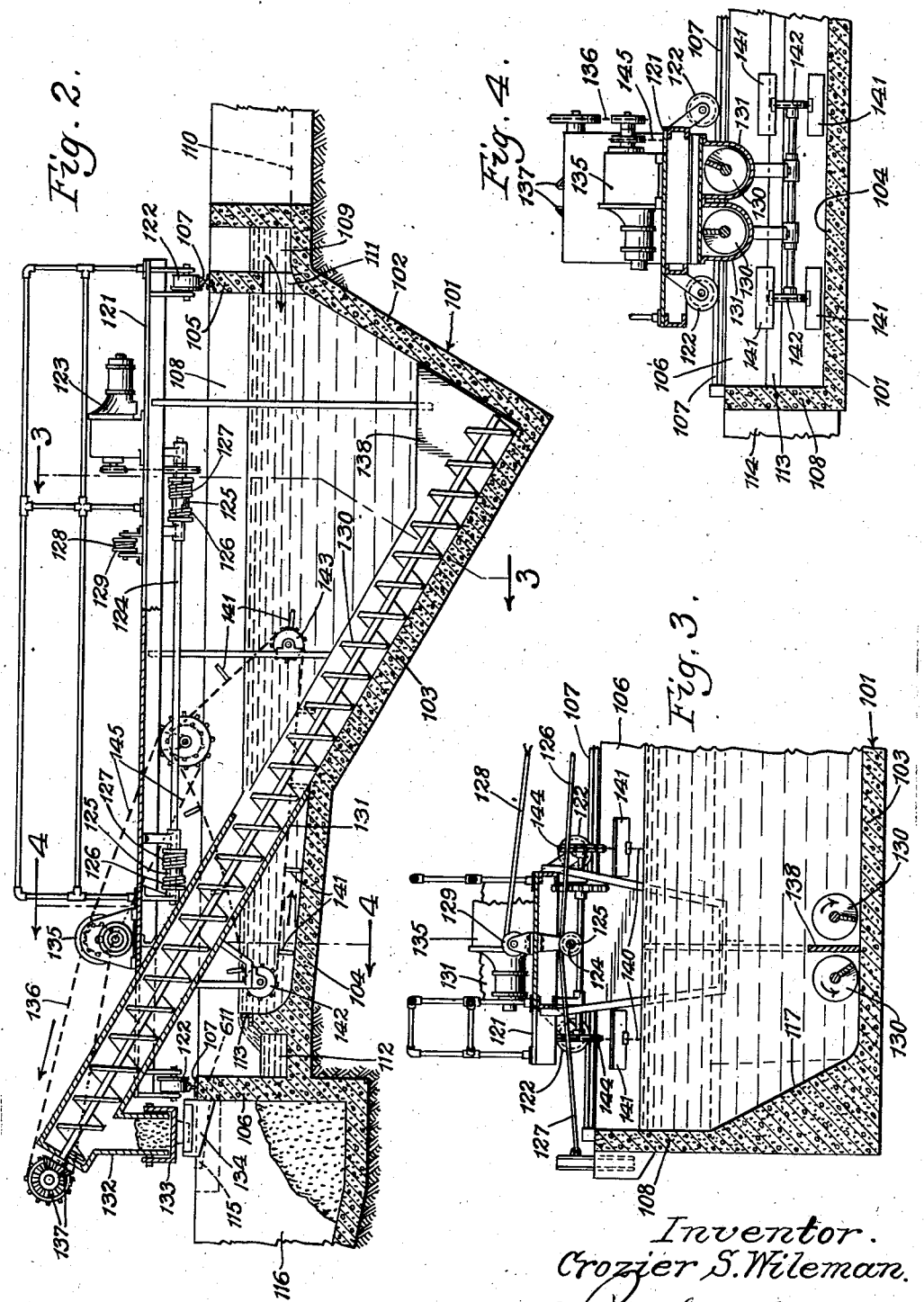

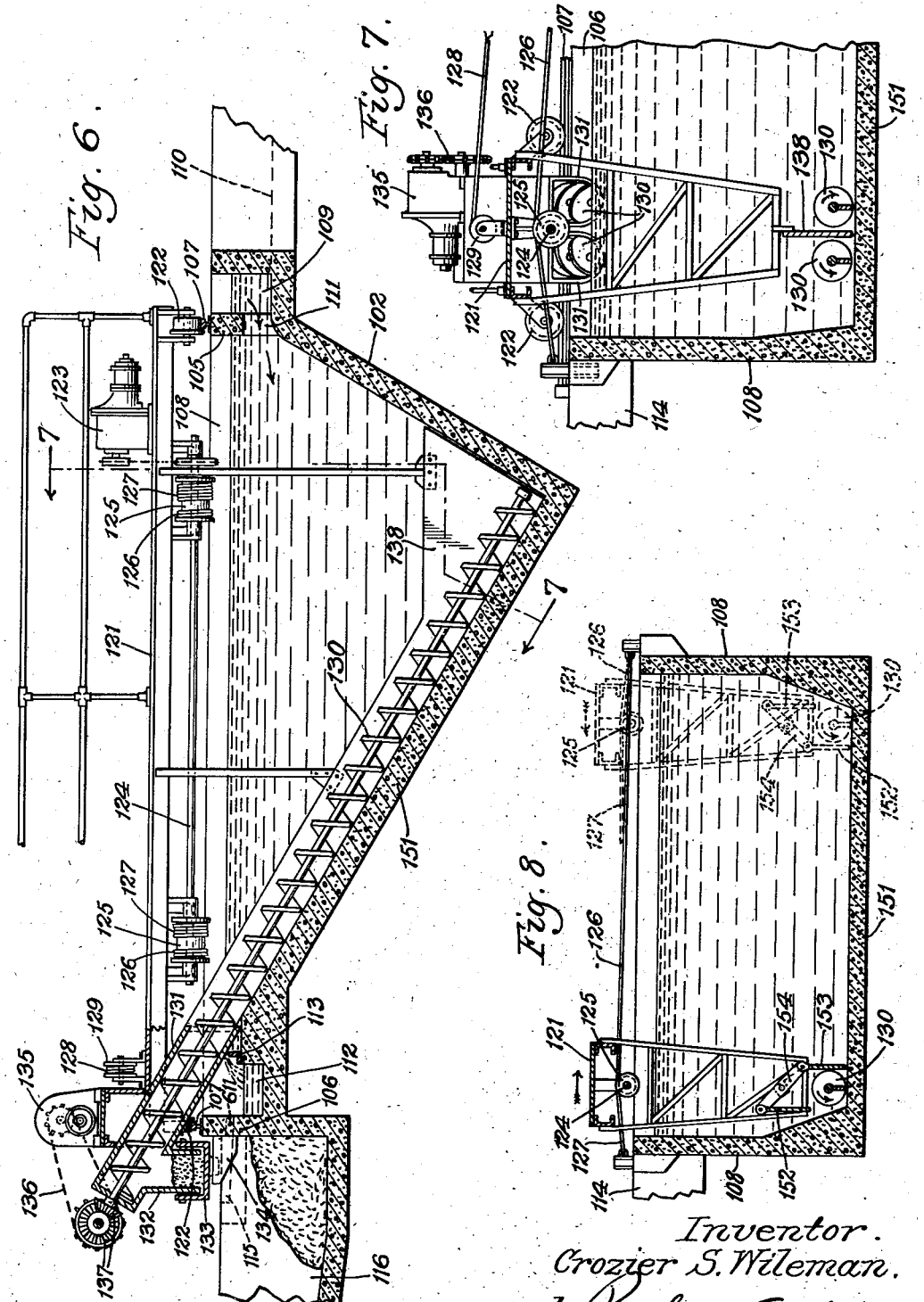

Patented Aug. 11, 1942

2,292,855

UNITED STATES PATENT OFFICE 2,292,855

GRIT COLLECTOR

Crozier S. Wileman, Lakewood, Ohio, assignor to Link-Belt Company, Chicago, Ill., a corporation of Illinois Original application March 10, 1937, Serial No. 130,010, now Patent No. 2,202,475, dated May 28, 1940. Divided and this application February 15, 1940, Serial No. 319,124

19 Claims. (Cl. 210—3)

My invention relates to apparatus for treating sewage and the like and has for one object to provide a so-called sewage grit chamber or settling tank wherein grit or relatively heavy inorganic material may be settled out of a flowing stream of sewage material and may be subsequently washed and separated from lighter organic material, the organic material being retained in the stream of sewage, the washed grit being discharged from the system.

My invention is adapted to provide means for accomplishing the above purpose and doing it in such a way that change in rate of flow and change in the character of the sewage will have a minimum effect upon the operation of the device.

Other objects will appear from time to time throughout the specification and claims.

The present application is a division of my copending application Serial No. 130,010 filed in the United States Patent Office on March 10, 1937, which has now matured into Patent Number 2,202,475, May 28, 1940.

My invention is illustrated more or less diagrammatically in the accompanying drawings wherein—

Figure 1 is a plan view of one embodiment of my invention;

Figure 2 is a section along the line 2—2 of Figure 1;

Figure 3 is a section along the line 3—3 of Figure 2;

Figure 4 is a section along the line 4—4 of Figure 2;

Figure 5 is a plan view of a modified form of the device;

Figure 6 is a section along the line 6—6 of Figure 5;

Figure 7 is a section along the line 7—7 of Figure 6;

Figure 8 is a view similar to Figure 7, showing a modified form wherein a single grit washing screw is used.

Like parts are indicated by like characters in the drawings.

101 is a rectangular tank having a V-shaped bottom, one side of which 102 is so sharply inclined that there will be no appreciable deposit of sediment thereon, the sediment sliding by gravity freely down therealong; the other part of the bottom or floor 103 is less sharply inclined. Associated with the sharply inclined floor 103 is a still less sharply inclined floor 104 adapted to support sediment which may be deposited thereon. The tank is bounded by longitudinal walls 105, and 106 which carry tracks or rails 107 and bounded by end walls 108. 109 is an influent trough supplied with sewage through the channel 110 and discharging sewage into the tank at a point below the water level through the apertures 111. 112 is an effluent trough associated with a weir 113 and discharging through an effluent channel 114. 115 is a drip trough carried on the wall 106 draining through ports 611 in wall 106 into the effluent trough 112. 117, 117 are floor panels adjacent the walls 108 also sharply inclined downwardly so as to permit free flow by gravity of the sediment.

121 is a bridge extending across the tank having anti-friction rollers 122, adapted to travel along the tracks 107. 123 is a motorized speed reducer driving a longitudinal shaft 124. On this shaft are drums 125 about which are wound cables 126, 127, the cables being anchored respectively at their ends on the walls 108. 128 is an electric cable anchored on the wall 108 and wound about a spring reel 129 whereby electric current is brought to the bridge. The motor of the motorized speed reducer 123 is automatically reversible so that as the motor operates it shuttles the bridge back and forth across the tank, reversing at each end of its excursion. The means for accomplishing this are standard electric control switches which are not illustrated.

Suspended on the bridge 121 is a screw conveyor 130. Its axis is generally parallel with the floor 103. It is enclosed in a trough 131 which extends upwardly from the floor 103 across the wall 106 and communicates with a grit hopper 132 having a gate 133 adapted to discharge into the grit bin 116 when the gate is opened by the gate opening stop 134. The screw conveyor is driven from a motorized speed reducer 135 by means of a chain drive 136 and the mitre gears 137. It will be understood that there are a pair of these screw conveyors, each in a separate trough both adapted to operate in unison. 138 is a grit plow or back blade interposed between the two conveyors and adapted to travel along the floor of the tank.

Also mounted on the bridge are a pair of flight conveyors comprising chains 140, flights 141, the chains traveling over sprockets 142, 143, 144. The sprockets 144 are driven by a chain 145 from the motorized speed reducer 135. These flight conveyors travel along the surface 104 and since there is one conveyor on each side of the bridge, these conveyors scrape across the floor 104 into the hopper formed between the floors 103, 102 and 117 and in whichever direction the bridge is moving, the leading flight conveyor scrapes the freshly deposited sludge down into the hopper where it can be picked up by the plow and the screw conveyors and conveyed upwardly, washed and discharged.

In the modified form shown in Figures 5, 6 and 7, the rectangular tank has merely the two inclined floors 102 and 151. Two screw conveyors 130 are supported on the bridge 121 and the flight conveyors are omitted. In this case, each screw conveyor comes clear to one end of the tank and does its work on the sludge in the tank without the interposition of the flight conveyor, the tank floor being such that all the sludge comes into the zone of influence of the screw conveyor and scraper.

In the modified form shown in Figure 8 but a single screw conveyor 130 is used and it is associated with two grit plow blades or back boards 152 and 153 supported on the bridge mounted on rocker arms 154 with a trip mechanism adapted to trip the rocker arms at each end of the excursion of the bridge so that a grit scraper is always on the rear side of the screw conveyor. The details of this trip mechanism are not shown as it forms no part of the present invention and is a standard engineering product.

I have shown in my specification and drawings a number of modified forms of the device with different shapes of tank, different types of conveyor and washer and various different combinations. Of course, many other combinations of these same elements or different elements might be adopted without departing materially from the spirit of my invention and I wish, therefore, that my showing be regarded as in a sense diagrammatic.

In general I propose that the agitation will be such as to prevent the settling out of lighter organic solids, while permitting settling out of heavier organic solids. This must be regarded, of course, as a general line of demarcation. There may be organic solids which will settle, there may be inorganic solids which will not settle. Even some lighter inorganic solids may be carried down with the heavier and settled, and the general proposition is that the division line is between certain heavy solids and certain light solids, and the heavy solids are to be disposed of in one way and the light solids in another.

The rate of rotation of the screw is such as to furnish a churning or agitating effect at the point of emergence so as to wash organics from the inorganics allowing these lighter particles to flow or float back into the tank. Any light organic or floatable material which may have been trapped with the settling grit is agitated by the screw and thrown back into suspension to be carried away by the liquid in the tank.

The organics are prevented from settling, not by the rate of flow of the current in the tank but by the agitating effect resulting from the movement of the bridge, the scraper, the screw and the grit plow as they travel through the body of liquid in the tank. The rate of travel is kept high enough so as to insure constant agitation at a rate sufficient to prevent the settling of the light organics while not sufficient to interfere with the settling out of the heavy inorganics or grit.

There is always a flow of liquid through the tank from the influent to the effluent when it is in operation. Under some circumstances the rate of flow may be such that the heavy inorganic materials will settle out and the light organic materials will remain in suspension. However, if the tank is designed to rely upon the flow rate for this separation, it will only be accurate and satisfactory with a comparatively small rate of flow variation. Wide variations both above and below the normal rate of flow will result in interfering with the proper operation of the device if flow rate alone is relied upon to effect separation. As flow increases above the normal the time soon comes when grit will be carried through. As flow decreases below the normal the time soon comes when excessive light organic materials settle out.

The device I propose substitutes for this variable agitation a positive, continuous mechanically controlled agitation which will be independent of the rate of flow, preferably the tank is enough larger with respect to the cross sectional area of the influent and effluent or of such volume with respect to the flow that the agitating and sedimentation control effect of the body movable conveying and washing mechanism will be the controlling factor. If the character of the material changes, the rate of speed of bodily movement and, so the resultant agitation may be changed by this arrangement, which puts it into the hands of the operator irrespective of conditions of flow, to control the point at which separation between the light solids carried off in suspension and the heavy solids settled out takes place. Preferably discharge is over a weir. Preferably the combined agitator, washer and conveyor extends upwardly above the level of the liquid across the weir, preferably the flow through the tank is in the same general direction as the direction of travel of the settled material, though the point of influent and effluent might be changed and means other than a weir might, if desired, be used.

I claim:

1. A grit chamber for sewage plants and the like comprising a rectangular tank having an inclined floor, an influent passage at one end of the tank, an effluent weir at the other, a combined grit washer and conveyor assembly mounted in the tank and means for moving the entire assembly back and forth along the tank to agitate the liquid in the tank and means for operating the conveyor to collect sludge, convey the sludge from the tank to wash the sludge at the point of emergence and discharge it at a point removed from the tank.

2. A grit chamber for sewage plants and the like comprising a rectangular tank having an inclined floor, an influent passage at one end of the tank, an effluent weir at the other, a combined grit washer and conveyor assembly mounted in the tank and means for moving the entire assembly back and forth along the tank to agitate the liquid in the tank and means for operating the conveyor to collect sludge, convey the sludge from the tank, to wash the sludge at the point of emergence and discharge it at a point removed from the tank, that part of the floor of the tank adjacent the weir being less sharply inclined than the remainder of the tank floor, auxiliary conveyor means mounted for movement with the main conveyor for propelling settled sludge backwardly toward and discharging it upon the more sharply inclined portion of the tank.

3. A grit chamber for sewage plants and the like comprising a rectangular tank having an inclined floor, an influent passage at one end of the tank, an effluent weir at the other, a combined grit washer and main conveyor assembly mounted in the tank and means for moving the entire assembly back and forth along the tank to agitate the liquid in the tank and means for operating the conveyor to collect sludge, convey the sludge from the tank, to wash the sludge at the point of emergence and discharge it at a point removed from the tank, that part of the floor adjacent the weir being less sharply inclined than the remainder of the tank floor, auxiliary conveyor means mounted for movement with the conveyor assembly for propelling sludge backwardly toward and discharging it upon the more sharply inclined portion of the tank, means associated with the conveyor assembly comprising a longitudinal sludge plow for collecting sludge and holding it in the zone of influence of the conveyor.

4. A grit chamber for sewage plants and the like comprising a rectangular tank having an inclined floor, an influent passage at one end of the tank, an effluent weir at the other, a combined grit washer and conveyor main assembly mounted in the tank and means for moving the entire assembly back and forth along the tank to agitate the liquid in the tank and driving means for moving the conveyor along the assembly to collect sludge, convey the sludge from the tank, to wash the sludge at the point of emergence and discharge it at a point removed from the tank, that part of the floor adjacent the weir being less sharply inclined than the remainder of the tank floor, an auxiliary conveyor means mounted for movement with the conveyor assembly and adapted to travel along the less sharply inclined portion of the floor for propelling sludge backwardly toward and discharging it upon the more sharply inclined portion of the tank, means associated with the conveyor main assembly comprising a longitudinal sludge plow for collecting sludge and holding it in the zone of influence of the conveyor, means for maintaining the sludge plow always on the back side of the auxiliary conveyor as it moves back and forth in the tank.

5. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid and means for discharging the heavier solids from the system and returning the lighter solids to the body of the liquid in the tank.

6. A grit chamber for sewage plants and the like including a tank having an inclined floor, influent and effluent passages associated therewith, a combined grit washer and conveyor assembly in the tank, means for bodily reciprocating the entire assembly along the floor to agitate the liquid contained within the tank, means for displacing the conveyor with respect to the assembly as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, an effluent weir adjacent the upper extremity of the inclined floor, the combined washer and conveyor extending across the weir.

7. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, the tank having a relatively level floor extending from the upper extremity of the inclined floor, an effluent weir bounding said level floor on the side farthest from the inclined floor and means connected to the combined washer and conveyor and movable therewith for propelling settled material along the level floor and discharging it upon the inclined floor.

8. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, the combined washer and conveyor including a screw conveying mechanism and a scraper blade movable therewith along the floor.

9. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, the combined washer and conveyor including a screw conveying mechanism and a scraper blade movable therewith along the floor, the scraper blade being so positioned that, irrespective of the direction of movement of the combined washer and conveyor, to hold material collected thereby in such position that the screw conveyor will act upon it.

10. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, the combined washer and conveyor including a plurality of screw conveyor members and a scraper blade between them.

11. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, the combined washer and conveyor including a screw conveyor member, and a plurality of scraper blades adapted to be selectively presented one of them at a time to the floor of the tank behind the screw conveyor as it is bodily displaced in a forward direction.

12. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, a relatively flat floor in continuation of the inclined floor of the tank, a conveyor adapted to be bodily displaced along the flat floor in unison with the combined washer and conveyor, and means for operating the conveyor on the relatively flat tank floor to cause it to discharge settled materials upon the inclined floor in the path of the combined washer and conveyor.

13. A grit chamber for sewage plants and the like including a tank having an inclined floor, influent and effluent passages associated therewith, a combined grit washer and conveyor in the tank, means for bodily reciprocating it along the floor to agitate the liquid contained within the tank, means for operating the conveyor as it is bodily displaced in either direction to cause it to collect material deposited on the floor, propel it upwardly therealong, agitate it and wash it at the point of emergence from the liquid, means for discharging the heavier solids from the system and returning the lighter solids to the body of the liquid in the tank, a relatively flat floor in continuation of the inclined floor of the tank, a conveyor adapted to be bodily displaced along the flat floor in unison with the combined washer and conveyor, and means for operating the conveyor to cause it to discharge settled material upon the inclined floor in the path of the combined washer and conveyor, the conveyor including flight conveyor members movable in a direction at right angles to the direction of bodily displacement of the combined grit washer and conveyor.

14. A grit chamber for sewage plants and the like including a generally rectangular tank having an inclined floor and influent and effluent passages associated therewith, a combined grit washer and conveyor in the tank, means for bodily displacing it along the floor to agitate the liquid contained within the tank at a rate of speed such that the agitation imparted by the bodily displacement of the combined washer and conveyor as it reciprocates along the floor of the tank from end to end thereof will maintain the liquid in a controlled state of agitation greater than and independent of any agitation resulting from the flow of liquid to and from the tank.

15. A grit chamber for sewage plants and the like including a tank having a liquid inlet, a liquid outlet, and a floor the angle of inclination of which is such that settled material will remain at rest thereon, tracks associated with the tank walls, a bridge and means for moving it back and forth along them, a conveying mechanism including a scraper blade supported on the bridge and adapted to travel therewith along the floor, means for controlling the level of the liquid in the tank, a trough projecting above the liquid level in alignment over the scraper blade, the upper end of the conveyor being contained therein, a grit receptacle associated with the trough and movable therewith, the trough extending beyond the periphery of the tank and adapted to discharge into the grit receptacle and means operating in coordination with the reciprocation of the bridge for periodically discharging grit from the receptacle.

16. A grit chamber for sewage plants and the like having inlets and outlets and including a tank having a floor the angle of inclination of which is such that settled material will remain at rest thereon, tracks associated with the tank walls, a bridge and means for moving it back and forth along them, a conveying mechanism including a scraper blade supported on the bridge and adapted to travel therewith along the floor, means for controlling the level of the liquid in the tank, a trough extending above the liquid level in alignment with the scraper blade, the upper end of the conveyor being contained therein, and means for discharging solids from the upper end of the trough outside of the tank.

17. A grit chamber for sewage plants and the like having inlets and outlets and including a tank having a floor the angle of inclination of which is such that settled material will remain at rest thereon, tracks associated with the tank walls, a bridge and means for moving it back and forth along them, a conveying mechanism including a scraper blade supported on the bridge and adapted to travel therewith along the floor, means for controlling the level of the liquid in the tank, a trough extending above the liquid level in alignment with the scraper blade, the upper end of the conveyor being contained therein, a grit receptacle associated with the trough and movable therewith, a grit hopper positioned along the line of travel of the grit receptacle and means adapted to open the grit receptacle to cause it to discharge into the hopper when the two are in register.

18. A grit chamber for sewage plants and the like having inlets and outlets and including a tank having a floor the angle of inclination of which is such that settled material will remain at rest thereon, tracks associated with the tank walls, a bridge and means for moving it back and forth along them, a conveying mechanism including a scraper blade supported on the bridge and adapted to travel therewith along the floor, means for controlling the level of the liquid in the tank, a trough extending above the liquid level in alignment with the scraper blade, the upper end of the conveyor being contained therein, and means for discharging solids from the upper end of the trough outside of the tank, a relatively flat floor extending beyond the upper edge of the inclined floor, the trough extending above the flat floor.

19. A grit chamber for sewage plants and the like including a tank having a liquid inlet, a liquid outlet, and a floor the angle of inclination of which is such that settled material will remain at rest thereon, tracks associated with the tank walls, a bridge and means for moving it back and forth along them, a conveying mechanism including a scraper blade supported on the bridge and adapted to travel therewith along the floor, means for controlling the level of the liquid in the tank, a trough extending above the liquid level in alignment with the scraper blade, the upper end of the conveyor being contained therein, and means for discharging solids from the upper end of the trough outside of the tank, a relatively flat floor extending beyond the upper edge of the inclined floor, the trough extending above the flat floor, conveying means movable with the bridge for discharging settled material from the flat floor to the inclined floor in the path of the scraper blade.

CROZIER S. WILEMAN.